(«12») United States Patent
Xu

(10) Patent No.: US 11,076,099 B1
(45) Date of Patent: Jul. 27, 2021

(54) USING REMOTE SENSORS TO RESOLVE START UP LATENCY IN BATTERY-POWERED CAMERAS AND DOORBELL CAMERAS

(71) Applicant: Ambarella International LP, Santa Clara, CA (US)

(72) Inventor: Ruian Xu, San Jose, CA (US)

(73) Assignee: Ambarella International LP, Santa Clara, CA (US)

( * ) Notice: Subject to any disclaimer, the term of this patent is extended or adjusted under 35 U.S.C. 154(b) by 66 days.

(21) Appl. No.: 16/587,563

(22) Filed: Sep. 30, 2019

(51) Int. Cl.
*H04N 5/232* (2006.01)

(52) U.S. Cl.
CPC ... *H04N 5/232411* (2018.08); *H04N 5/23218* (2018.08); *H04N 5/23258* (2013.01)

(58) Field of Classification Search
CPC ......... H04N 5/232411; H04N 5/23218; H04N 5/23258; G06T 7/292
See application file for complete search history.

(56) References Cited

U.S. PATENT DOCUMENTS

| | | | | |
|---|---|---|---|---|
| 10,657,784 | B1* | 5/2020 | Gordon | G08B 13/19695 |
| 2008/0136914 | A1* | 6/2008 | Carlson | G08B 13/19695 |
| | | | | 348/155 |
| 2015/0156031 | A1* | 6/2015 | Fadell | G08B 19/005 |
| | | | | 700/276 |
| 2016/0094810 | A1* | 3/2016 | Mirza | H04L 67/125 |
| | | | | 348/159 |
| 2016/0189500 | A1* | 6/2016 | Kim | G08B 13/19608 |
| | | | | 386/223 |
| 2018/0033153 | A1* | 2/2018 | Hirasawa | G06K 9/00 |
| 2018/0232895 | A1* | 8/2018 | Modestine | G08B 15/001 |

* cited by examiner

Primary Examiner — Nhan T Tran
(74) Attorney, Agent, or Firm — Christopher P. Maiorana, PC

(57) ABSTRACT

An apparatus comprises a camera and one or more sensors. The camera generally has a low power deactivated mode. The one or more sensors are generally remotely located with respect to the camera. The one or more sensors may be configured to communicate a signal to the camera in response to a trigger condition. The camera is generally configured to activate in response to receiving the signal from the one or more sensors.

18 Claims, 8 Drawing Sheets

USING REMOTE SENSORS TO RESOLVE START UP LATENCY IN BATTERY-POWERED CAMERAS AND DOORBELL CAMERAS

FIELD OF THE INVENTION

The invention relates to security cameras generally and, more particularly, to a method and/or apparatus for implementing remote sensors to resolve start up latency in battery-powered cameras and doorbell cameras.

BACKGROUND

Battery powered doorbell cameras are typically powered off, or in ultra-low power standby mode in order to conserve energy. When an event triggers the battery powered camera to start up (or activate), the camera typically takes a finite amount of time to power up and start operation (e.g., video encoding, etc.). A battery powered doorbell could also be installed on a side wall of a porch to image the door instead of facing the path a person walks up toward the door. The startup latency and/or limited view create a problem when a package theft occurs. Because there is a delay before the camera is fully operating, the camera is only able to capture the back of the head of a thief. If the thief sees the camera, the delay gives the thief enough time to cover up their face, turn around from the camera, etc.

It would be desirable to implement remote sensors to resolve start up latency in battery-powered cameras and doorbell cameras.

SUMMARY

The invention concerns an apparatus comprising a camera and one or more sensors. The camera generally has a low power deactivated mode. The one or more sensors are generally remotely located with respect to the camera. The one or more sensors may be configured to communicate a signal to the camera in response to a trigger condition. The camera is generally configured to activate in response to receiving the signal from the one or more sensors.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing using remote sensors to resolve start up latency in battery-powered cameras and doorbell cameras that may (i) use remote sensor(s) to trigger camera prior to object entering field of view of camera, (ii) utilize standalone low power sensor(s) to detect motion, (iii) utilize standalone smart motion sensor(s) to detect objects, (iv) communicate using low power radio frequency signals (e.g., BLE, sub-1 GHz, ZIGBEE, etc.), (v) use direct communication between remote sensor(s) and camera, (vi) connect via WiFi router or base station, (vii) collect statistics to improve remote sensor placement, (viii) detect remote sensor(s) fault(s) for greater robustness, (ix) be implemented in battery-powered and/or doorbell cameras, and/or (x) be implemented as one or more integrated circuits.

Figure 1:
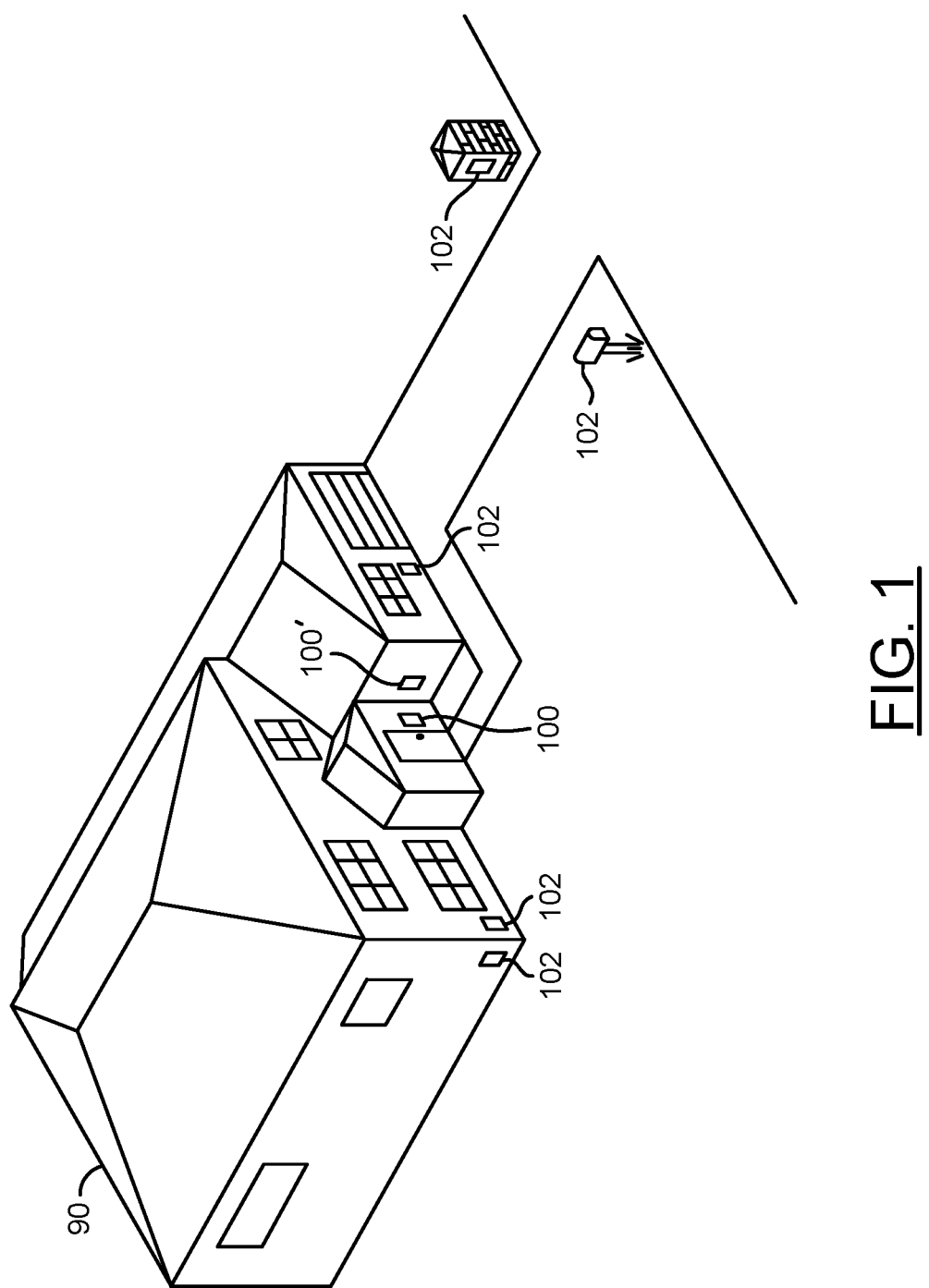
FIG. 1 is a diagram illustrating a context of an example embodiment of the invention.

Referring to FIG. 1, a diagram is shown illustrating a context in which an example embodiment of the invention may be implemented. In an example, a residential setting may include a house 90. The house 90 may present a number of locations that may be monitored for security purposes. In an example, a camera 100 may be attached (or mounted) next to an entryway (e.g., front door) of the house 90 (e.g., facing a front door pathway). In another example, a camera 100' may be mounted to a sidewall of a porch of the house 90 (e.g., facing the entry way). In an example, one or more sensors 102 may be mounted remotely from the camera 100 (e.g., to a wall and/or a soffit of the house 90, to a mailbox and/or a driveway marker of the house 90, etc.). The camera 100 is generally directed toward an environment adjacent to house 90 to be monitored. In an example, the one or more sensors 102 are generally mounted outside a field-of-view of the camera 100. In an example, the camera 100 may be implemented as a battery-powered camera or a doorbell camera. In an example, the camera 100 may be configured for low power operation (e.g., a battery-powered camera).

In an example embodiment, the camera 100 may comprise a monochrome, an RGB, or an RGB-IR image sensor, an infrared light source, a visible (e.g., white) light source, and an onboard motion detector. The image sensor, light sources, and onboard motion detector may be directed toward the environment to be monitored. In various embodiments, the light sources may be implemented as light emitting diodes (LEDs). In an example, the onboard motion detector may be implemented as a passive infrared (PIR) sensor. Passive infrared (PIR) sensors generally use very little power.

In various embodiments, the camera 100 may be configured to remain in a power down state until motion is detected (e.g., by the onboard motion sensor or a remote sensor 102). In an example, the onboard motion detector may be activated while the image sensor and light sources of the camera 100 are inactive. When motion is detected (e.g., by either the onboard or remote motion sensors 102), a trigger signal may generated by the onboard and/or remote motion sensors 102. In an example, the trigger signal from the remote sensor(s) 102 may be communicated using a low power radio frequency (RF) signal (e.g., BLUETOOTH Low Energy (BLE), sub-1 GHz, ZIGBEE, etc.). In response to the trigger signal, the image sensor and infrared light source (e.g., one or more IR LEDs) of the camera 100 may be activated to allow the camera 100 to confirm and/or identify a source of the detected motion. In some embodiments, when an object is identified as being close enough to allow capture of color information, the camera 100 may determine whether sufficient ambient visible light is present and/or turn on the visible light source.

In an example, the camera 100 may be configured to cover a wide field of view (FOV). In an example, the field of view may encompass the area adjacent to the front door, or some other area around the house 90 to be monitored. In an example, the camera 100 may a camera system on chip (SoC) coupled to the image sensor, the light sources, and the motion detector. In various embodiments, the camera SoC may be configured to operate in low or no light environments, and to use very little power.

In an example operation, the onboard motion detector may be in the activated state and the image sensor and light sources may be in a non-activated stated. When an object moves to the monitored area (e.g., within a detection range of the onboard sensor or the one of the sensors 102), the camera 100 may be triggered. In response to the camera 100 being triggered, the camera SoC may turn on the image sensor and one or more infrared (IR) LEDs. When the image sensor and IR LEDs are activated, the camera SoC may start generating a video stream comprising black and white (BW) video captured from the image sensor. The visible light source may be left in the non-activated state during this time. When the object moves closer (e.g., towards the front door), the white light LED may be turned on and the camera SoC may start capturing color information from the image sensor.

In an example, the camera SoC may be configured to analyze trigger signals received (e.g., timing, source, etc.) and generate statistics (e.g., relating remote sensor detection time and onboard sensor detection time, etc.). In some embodiments, the statistics generated by the camera SoC may be utilized to suggest remote sensor placement. In another example, the camera SoC may be configured to analyze the trigger signals received and generate statistics relating remote sensor operation, faults, and/or health. In some embodiments, the statistics generated by the camera SoC may be utilized to suggest remote sensor relocation or replacement. In an example, the camera SoC may be configured to generate a report regarding remote sensor operation that may be sent to a user.

Figure 2:
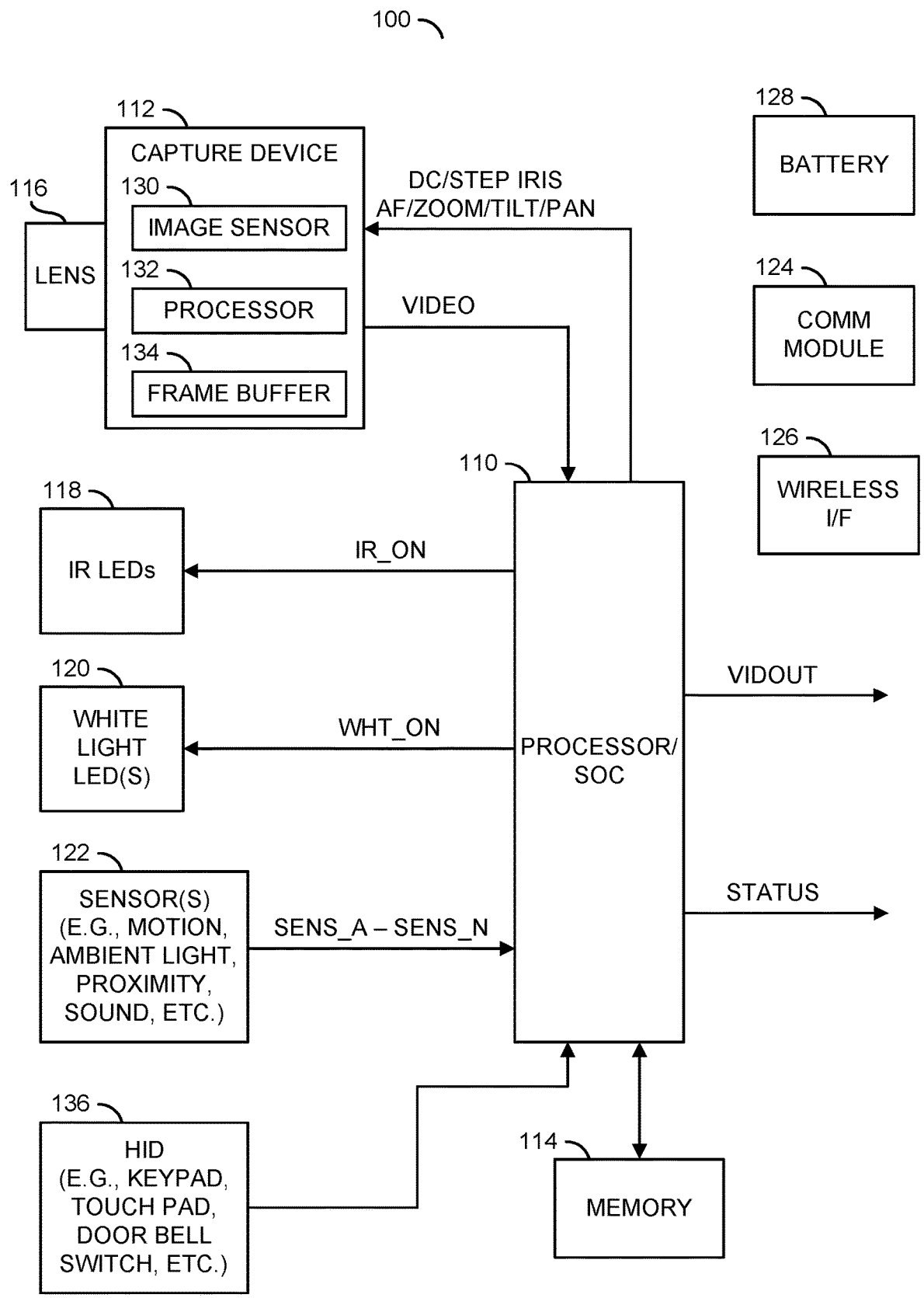
FIG. 2 is a schematic diagram illustrating components of a security system in accordance with an example embodiment of the invention.

Referring to FIG. 2, a block diagram of the camera 100 is shown illustrating an example implementation. In an example, the camera 100 may comprise a block (or circuit) 110, a block (or circuit) 112, a block (or circuit) 114, a block (or circuit) 116, a block (or circuit) 118, a block (or circuit) 120, a block (or circuit) 122, a block (or circuit) 124, a block (or circuit) 126, and/or a block (or circuit) 128. The circuit 110 may be implemented as a processor or system on Chip (SoC). The circuit 112 may be implemented as a capture device. The circuit 114 may be implemented as a memory. The block 116 may be implemented as a lens. The circuit 118 may be implemented as one or more infrared (IR) light emitting diodes (LEDs). The circuit 120 may be implemented as one or more visible (e.g., white) light emitting diodes (LEDs). The circuit 122 may be implemented as one or more sensors. The circuit 124 may be implemented as a communication device. The circuit 126 may be implemented as a wireless interface. The circuit 128 may be implemented as a battery.

In some embodiments, the camera 100 may comprise the processor/SoC 110, the image sensor 112, the memory 114, the lens 116, the IR LEDs 118, the visible light LEDs 120, the sensors 122, the communication module 124, the wireless interface 126, and the battery 128. In another example, the camera 100 may comprise the capture device 112, the lens 116, the IR LEDs 118, the visible light LEDs 120, and the sensors 122, and the SoC 110, the memory 114, the communication module 124, the wireless interface 126, and the battery 128 may be components of a separate device. The implementation of the camera 100 may be varied according to the design criteria of a particular implementation.

The lens 116 may be attached to the capture device 112. In an example, the capture device 112 may comprise a block (or circuit) 130, a block (or circuit) 132, and a block (or circuit) 134. In an example, the circuit 130 may be an image sensor (e.g., monochrome, RGB, RGB-IR, etc. The circuit 132 may be a processor and/or logic. The circuit 134 may be a memory circuit (e.g., a frame buffer).

The capture device 112 may be configured to capture video image data (e.g., light collected and focused by the lens 116). The capture device 112 may capture data received through the lens 116 to generate a video bitstream (e.g., a sequence of video frames). In various embodiments, the lens 116 may be implemented as a fixed focus lens. A fixed focus lens generally facilitates smaller size and low power. In an example, a fixed focus lens may be used in battery powered and doorbell camera applications. In some embodiments, the lens 116 may be directed, tilted, panned, zoomed and/or rotated to capture the environment surrounding the camera 100 (e.g., capture data from the field of view). In an example, professional camera models may be implemented with an active lens system for enhanced functionality, remote control, etc.

The capture device 112 may transform the received light into a digital data stream. In some embodiments, the capture device 112 may perform an analog to digital conversion. For example, the image sensor 130 may perform a photoelectric conversion of the light received by the lens 116. The processor 132 may transform the digital data stream into a video data stream (or bitstream), a video file, and/or a number of video frames. In an example, the capture device 112 may present the video data as a digital video signal (e.g., VIDEO). The digital video signal may comprise the video frames (e.g., sequential digital images and/or audio).

The video data captured by the capture device 112 may be represented as a signal/bitstream/data VIDEO (e.g., a digital video signal). The capture device 112 may present the signal VIDEO to the processor/SoC 110. The signal VIDEO may represent the video frames/video data. The signal VIDEO may be a video stream captured by the capture device 112.

The image sensor 130 may receive light from the lens 116 and transform the light into digital data (e.g., the bitstream). For example, the image sensor 130 may perform a photoelectric conversion of the light from the lens 116. In some embodiments, the image sensor 130 may have extra margins that are not used as part of the image output. In some embodiments, the image sensor 130 may not have extra margins. In various embodiments, the image sensor 130 may be configured to generate an RGB-IR video signal. In an infrared light only illuminated field of view, the image sensor 130 may generate a monochrome (e.g., B/W) video signal. In a field of view illuminated by both IR light and visible light, the image sensor 130 may be configured to generate color information in addition to the monochrome video signal. In various embodiments, the image sensor 130 may be configured to generate a video signal in response to visible and/or infrared (IR) light.

The processor/logic 132 may transform the bitstream into a human viewable content (e.g., video data that may be understandable to an average person regardless of image quality, such as the video frames). For example, the processor/logic 132 may receive pure (e.g., raw) data from the RGB-IR sensor 130 and generate (e.g., encode) video data (e.g., the bitstream) based on the raw data. The capture device 112 may have the memory 134 to store the raw data and/or the processed bitstream. For example, the capture device 112 may implement the frame memory and/or buffer 134 to store (e.g., provide temporary storage and/or cache) one or more of the video frames (e.g., the digital video signal). In some embodiments, the processor/logic 132 may perform analysis and/or correction on the video frames stored in the memory/buffer 134 of the capture device 112.

The sensors 122 may implement a number of sensors including, but not limited to, motion sensors, ambient light sensors, proximity sensors (e.g., ultrasound, radar, lidar, etc.), audio sensors (e.g., a microphone), etc. In embodiments implementing a motion sensor, the sensors 122 may include both onboard and remotely located sensors configured to detect motion anywhere in or near the field of view monitored by the camera 100. In various embodiments, the detection of motion may be used as one threshold for activating the capture device 112. The sensors 122 may be implemented as an internal component of the camera 100 and/or as a component external to the camera 100 (e.g., remote sensors 102, etc.). In an example, the sensors 122 may be implemented as a passive infrared (PIR) sensor. In another example, the sensors 122 may be implemented as a smart motion sensor. In embodiments implementing the smart motion sensor, the sensors 122 may comprise a low resolution image sensor configured to detect motion and/or run person detection).

In various embodiments, the sensors 122 may generate signals (e.g., SENS_A-SENS_N). The signals SENS_A-SENS_N may comprise a variety of data (or information) collected by the sensors 122. In an example, the signals SENS_A-SENS_N may comprise data collected in response to motion being detected in the monitored field of view, a remote location outside the monitored field of view, an ambient light level in the monitored field of view, and/or sounds picked up in and/or out of the monitored field of view. However, other types of data may be collected and/or generated based upon design criteria of a particular application. The signals SENS_A-SENS_N may be presented to the processor/SoC 110. In an example, the sensors 122 may generate (assert) the signals SENS_A-SENS_N when motion is detected in the field of view monitored by the respective sensors. In another example, the sensors 122 may generate (assert) the signals SENS_A-SENS_N when triggered by audio in the field of view monitored by the camera 100 and/or sensors 102. In still another example, the sensors 122 may be configured to provide directional information with respect to motion and/or sound detected in and/or out of the field of view. The directional information may also be communicated to the processor/SoC 110 via the signals SENS_A-SENS_N.

The processor/SoC 110 may be configured to execute computer readable code and/or process information. In various embodiments, the computer readable code may be stored within the processor/SoC 110 (e.g., microcode, etc.) and/or in the memory 114. The processor/SoC 110 may be configured to receive input from and/or present output to the memory 114. The processor/SoC 110 may be configured to present and/or receive other signals (not shown). The number and/or types of inputs and/or outputs of the processor/SoC 110 may be varied according to the design criteria of a particular implementation. The processor/SoC 110 may be configured for low power (e.g., battery) operation.

The processor/SoC 110 may receive the signal VIDEO and the signal SENS. The processor/SoC 110 may generate a video output signal (e.g., VIDOUT) based on the signal VIDEO, the signals SENS_A-SENS_N, and/or other input. In some embodiments, the signal VIDOUT may be generated based on analysis of the signal VIDEO and/or objects detected in the signal VIDEO. In various embodiments, the processor/SoC 110 may be configured to perform one or more of feature extraction, object detection, object tracking, and object identification. For example, the processor/SoC 110 may determine motion information by analyzing a frame from the signal VIDEO and comparing the frame to a previous frame. The comparison may be used to perform digital motion estimation. In some embodiments, the processor/SoC 110 may be configured to generate the video output signal VIDOUT comprising video data from the signal VIDEO. The video output signal VIDOUT may be presented to the memory 114, the communications module 124, and/or the wireless interface 126.

The memory 114 may store data. The memory 114 may implement various types of memory including, but not limited to, as a cache, flash memory, memory card, random access memory (RAM), dynamic RAM (DRAM) memory, etc. The type and/or size of the memory 114 may be varied according to the design criteria of a particular implementation. The data stored in the memory 114 may correspond to a video file, motion information (e.g., readings from the sensors 122), video fusion parameters, image stabilization parameters, user inputs, and/or metadata information.

The lens 116 (e.g., camera lens) may be directed to provide a view of an environment surrounding the camera 100. The lens 116 may be aimed to capture environmental data (e.g., light). The lens 116 may be wide-angle lenses and/or fish-eye lenses (e.g., lenses capable of capturing a wide field of view). The lens 116 may be configured to capture and/or focus the light for the capture device 112. Generally, the image sensor 130 is located behind the lens 116. Based on the captured light from the lens 116, the capture device 112 may generate a bitstream and/or video data.

The communications module 124 may be configured to implement one or more communications protocols. For example, the communications module 124 and the wireless interface 126 may be configured to implement one or more of, IEEE 802.11, IEEE 802.15, IEEE 802.15.1, IEEE 802.15.2, IEEE 802.15.3, IEEE 802.15.4, IEEE 802.15.5, IEEE 802.20, Bluetooth®, Bluetooth® LE, and/or ZigBee. In some embodiments, the wireless interface 126 may also implement one or more protocols (e.g., GSM, CDMA, GPRS, UMTS, CDMA2000, 3GPP LTE, 4G/HSPA/WiMAX, SMS, etc.) associated with cellular communication networks. In embodiments where the camera 100 is implemented as a wireless camera, the protocol implemented by the communications module 124 and wireless interface 126 may be a wireless communications protocol. The type of communications protocols implemented by the communications module 124 may be varied according to the design criteria of a particular implementation.

The communications module 124 and/or the wireless interface 126 may be configured to generate a broadcast signal as an output from the camera 100. The broadcast signal may send the video data VIDOUT to external devices. For example, the broadcast signal may be sent to a cloud storage service (e.g., a storage service capable of scaling on demand). In some embodiments, the communications module 124 may not transmit data until the processor/SoC 110 has performed video analytics to determine that an object is in the field of view of the camera 100.

In some embodiments, the communications module 124 may be configured to generate a manual control signal. The manual control signal may be generated in response to a signal from a user received by the communications module 124. The manual control signal may be configured to activate the processor/SoC 110. The processor/SoC 110 may be activated in response to the manual control signal regardless of the power state of the camera 100.

In some embodiments, the camera 100 may include a battery 128 configured to provide power for the various components of the camera 100. The multi-step approach to activating and/or disabling the capture device 112 based on the output of the motion sensor(s) 122 and/or any other power consuming features of the camera 100 may be implemented to reduce a power consumption of the camera 100 and extend an operational lifetime of the battery 128. The onboard motion sensor of the sensors 122 may have a very low drain on the battery 128 (e.g., less than 10 μW). In an example, the onboard motion sensor of the sensors 122 may be configured to remain on (e.g., always active) unless disabled in response to feedback from the processor/SoC 110. The video analytics performed by the processor/SoC 110 may have a large drain on the battery 128 (e.g., greater than the onboard motion sensor). In an example, the processor/SoC 110 may be in a low-power state (or power-down) until some motion is detected by the onboard motion sensor or the remote motion sensors 122.

The camera 100 may be configured to operate using various power states. For example, in the power-down state (e.g., a sleep state, a low-power state) the onboard motion sensor 122 and the processor/SoC 110 may be on and other components of the camera 100 (e.g., the image capture device 112, the memory 114, the communications module 124, etc.) may be off. In another example, the camera 100 may operate in an intermediate state. In the intermediate state, the image capture device 112 may be on and the memory 114 and/or the communications module 124 may be off. In yet another example, the camera 100 may operate in a power-on (or high power) state. In the power-on state, the onboard motion sensor 122, the processor/SoC 110, the capture device 112, the memory 114, and/or the communications module 124 may be on. The camera 100 may consume some power from the battery 128 in the power-down state (e.g., a relatively small and/or minimal amount of power). The camera 100 may consume more power from the battery 128 in the power-on state. The number of power states and/or the components of the camera 100 that are on while the camera 100 operates in each of the power states may be varied according to the design criteria of a particular implementation.

In some embodiments, the camera 100 may include a keypad, a touch pad (or screen), a doorbell switch, and/or other human interface devices (HIDs) 136. In an example, the sensors 122 may be configured to determine when an object is in proximity to the HIDs 136. In an example where the camera 100 is implemented as part of an access control application, the white light LED 120 may be turned on to provide illumination for identifying a person attempting access, illumination of a lock area, and/or illumination for an access touch pad.

Figure 3:
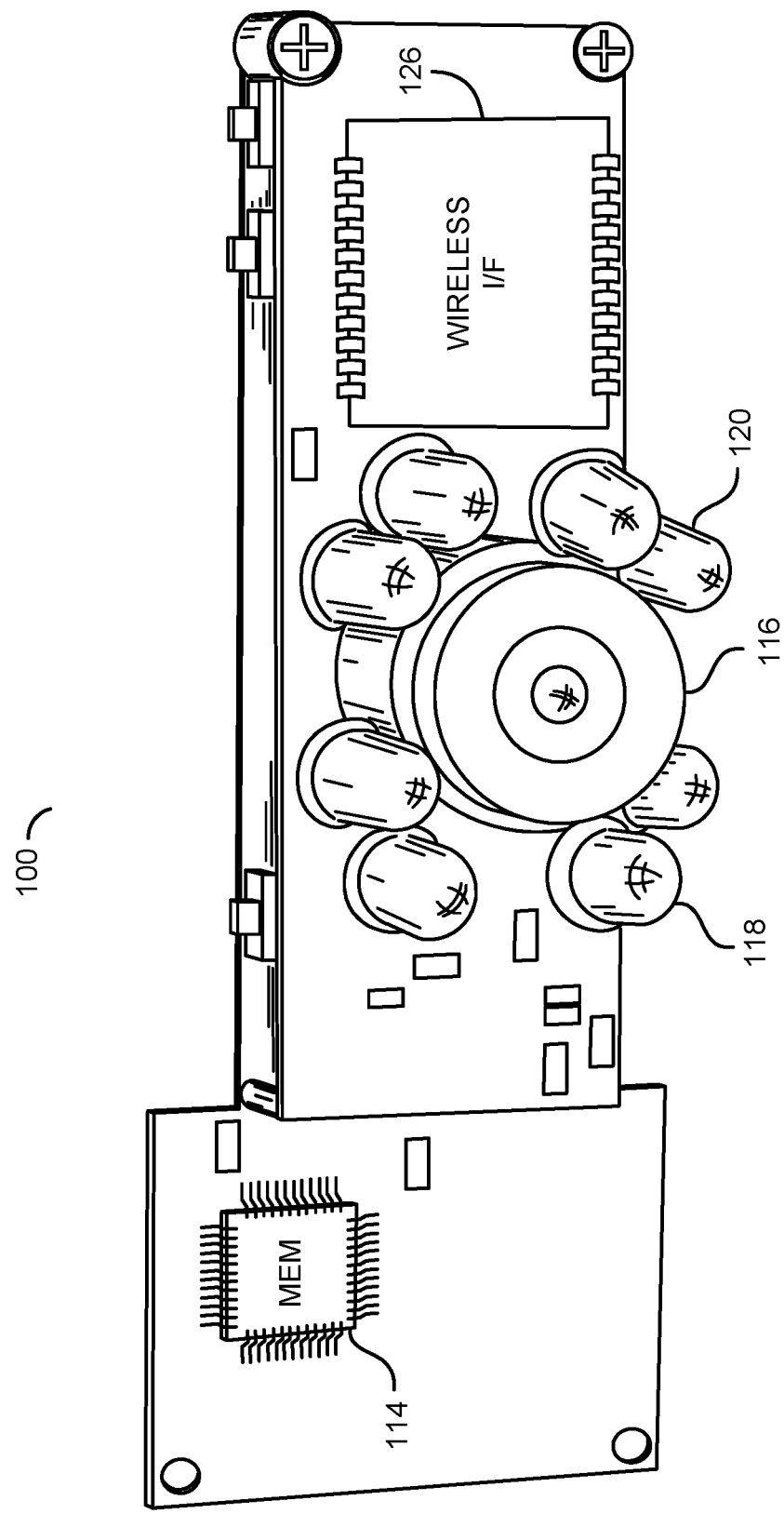
FIG. 3 is a diagram illustrating an example implementation of a camera in accordance with an example embodiment of the invention.

Referring to FIG. 3, a diagram is shown illustrating an example implementation of the camera 100 in accordance with an embodiment of the invention. In various embodiments, the camera 100 may comprise one or more circuit boards. In embodiments implementing more than one circuit board, the printed circuit boards may be mounted together. In an example, a first printed circuit board may include the lens 116, a number of IR LEDs 118, one or more visible (white) light LEDs 120, and the wireless interface circuit (or module) 126, and a second printed circuit board may include the memory circuit (or chip) 114, the processor/SoC 110 and the image sensor 112 (obscured by the first printed circuit board). In one example, the wireless interface 126 may comprise a pre-certified wireless/cellular protocol module.

Figure 4:
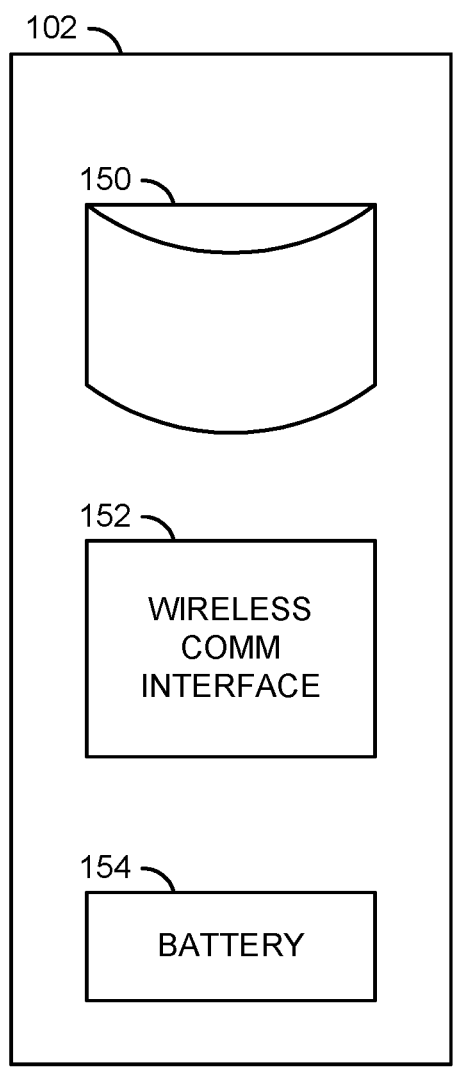
FIG. 4 is a diagram illustrating an example implementation of a remote sensor in accordance with an example embodiment of the invention.

Referring to FIG. 4, a diagram is shown illustrating an example implementation of a remote sensor 102 in accordance with an example embodiment of the invention. In an example, each of the remote sensors 102 may comprise a motion sensor 150, a wireless communication interface 152, and a battery 154. In an example, the sensor 150 may be implemented as a passive infrared (PIR) sensor. The wireless communication interface 152 may be configured to communicate with the camera 100 using low power radio frequency signals (e.g., BLE, sub-1 GHz, ZIGBEE, etc.). The sensor 102 is generally configured to operate with the battery 154 as the sole power source.

Figure 5:
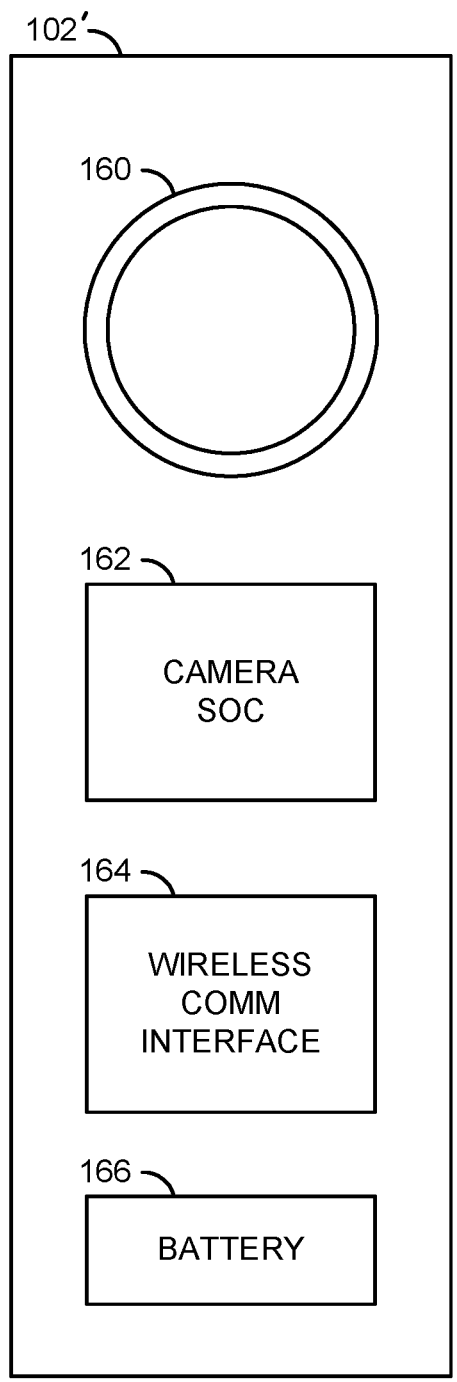
FIG. 5 is a diagram illustrating another example implementation of a remote sensor in accordance with an example embodiment of the invention.

Referring to FIG. 5, a diagram is shown illustrating another example implementation of a remote sensor 102' in accordance with an example embodiment of the invention. In an example, the remote sensor 102' may comprise a smart motion sensor. In embodiments implementing the smart motion sensor, the sensors 102 may comprise a low resolution image sensor 160, a camera system on Chip (SoC) 162, a wireless communication interface 164, and a battery 166. The camera SoC 162 may be configured to detect motion and/or run person detection locally (e.g., without going to cloud). In an example, the camera SoC 162 may utilize neural network (or deep learning) technology to implement person detection. The wireless communication interface 164 may be configured to communicate with the camera 100 using low power radio frequency (RF) signals (e.g., BLE, sub-1 GHz, ZIGBEE, etc.). The sensor 102' is generally configured to operate with the battery 166 as the sole power source.

Figure 6:
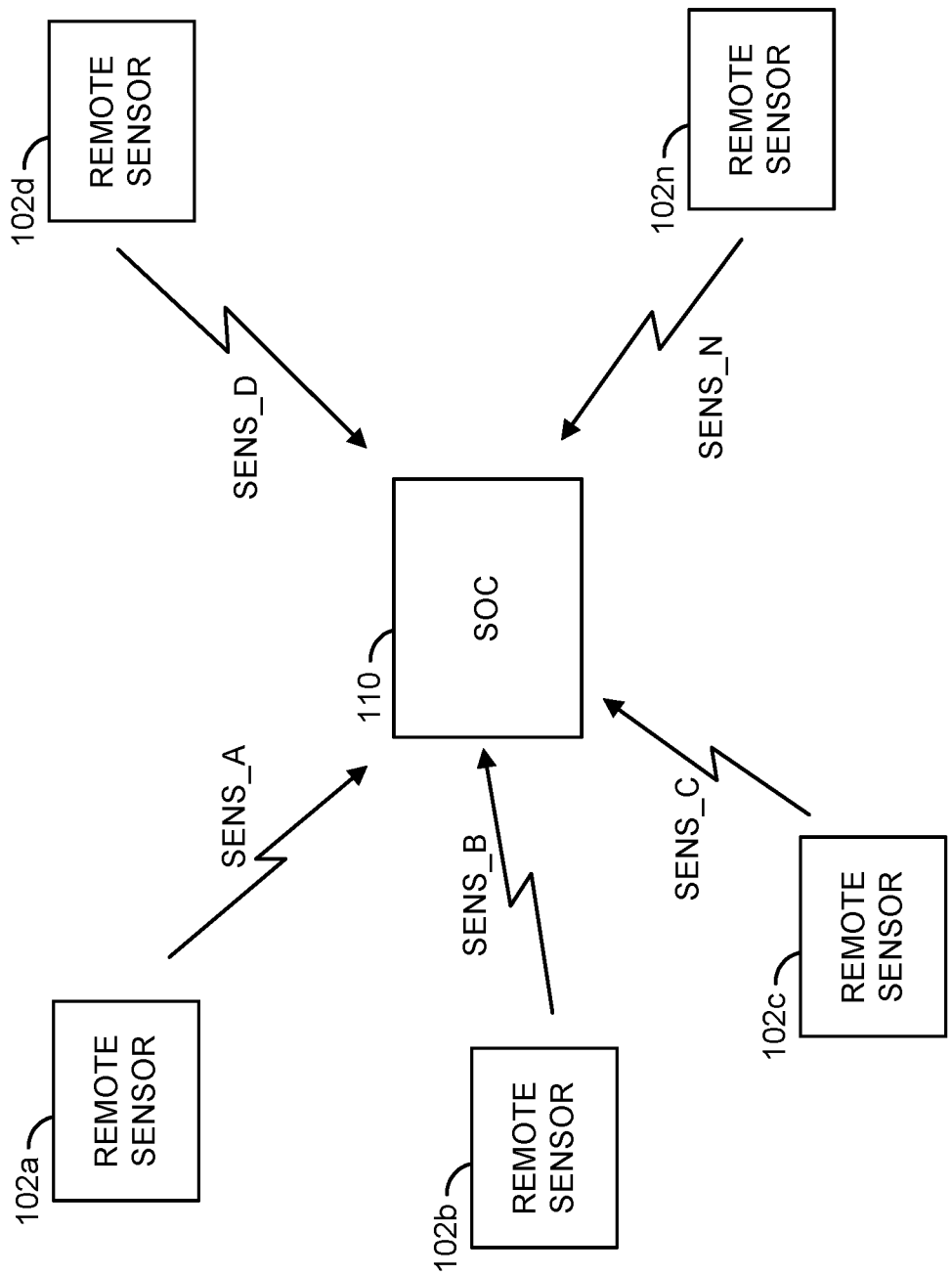
FIG. 6 is a diagram illustrating example signal/data flows in accordance with example embodiments of the invention.

Referring to FIG. 6, a diagram is shown illustrating example signal/data flows in accordance with example embodiments of the invention. In various embodiments, a system may be set up comprising the camera 100 and a plurality of remote sensors 102a-102n. Each of the remote sensors 102a-102n may send a respective trigger signal SENS_A-SENS_N to the processor/SoC 110 in the camera 100. The signals SENS_A-SENS_N are generally communicated using low power RF signals (e.g., BLE, sub-1 GHz, ZIGBEE, etc.). In an example, the signals SENS_A-SENS_N may be configured to simply trigger activation of the camera 100 based on detection of motion or proximity. In another example, the signals SENS_A-SENS_N may be configured to communicated additional information (e.g., identifying detected person, remote sensor status, battery status, etc.). In some embodiments, the communication between the camera 100 and the remote sensors 122 may be bidirectional. In an example, the camera 100 may be configured to relay (flash) updates to the remote sensors 122.

Figure 7:
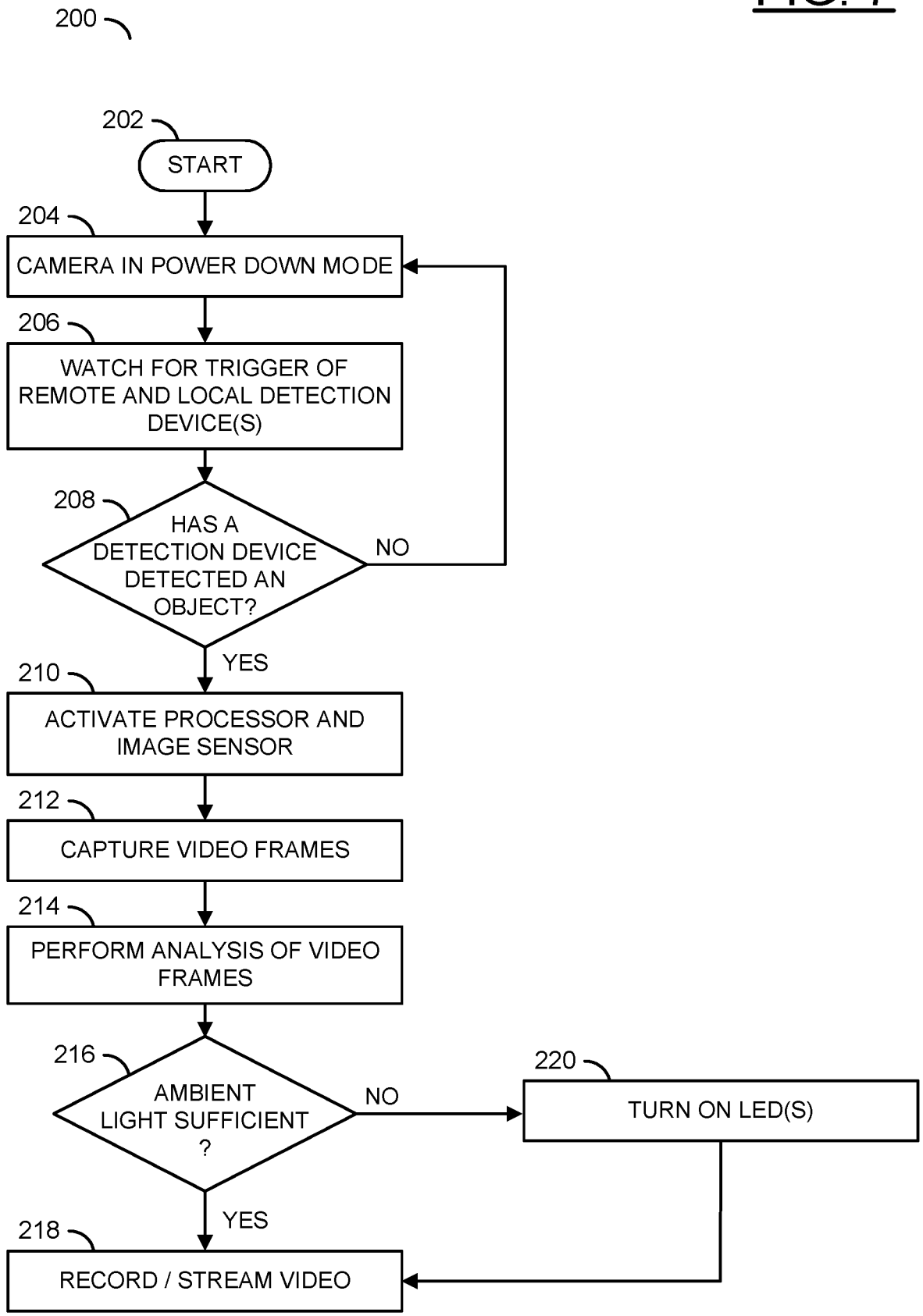
FIG. 7 is a diagram illustrating a process in accordance with an example embodiment of the invention.

Referring to FIG. 7, a flow diagram is shown illustrating a process 200 in accordance with an example embodiment of the invention. The process (or method) 200 may save battery life on a battery-powered camera 100. The method 200 generally comprises a step (or state) 202, a step (or state) 204, a step (or state) 206, a decision step (or state) 208, a step (or state) 210, a step (or state) 212, a step (or state) 214, a decision step (or state) 216, a step (or state) 218, and a step (or state) 220. The state 202 may start the method 200. The method 200 may then move to the state 204.

In the state 204, the camera 100 may be in a power down mode (e.g., a sleep mode, a low power mode, etc.). In the state 206, the camera 100 may watch for a trigger signal from any of the sensors 122. In an example, the trigger signals may be sent asynchronously. The camera is generally capable of reacting to a trigger signal even when in an inactive state. In the decision state 208, the camera 100 may react to receiving a trigger signal (e.g., the signals SENS_A-SENS_N) from one or more of the sensors 122. If a trigger signal has not been received from the sensors 122, the method 200 may return to the state 204. If a trigger signal has been received from the sensors 122, the method 200 may move to the state 210.

In the state 210, the camera 100 activates the processor/SoC 110 and image sensor 112. In the state 212, the image capture device 112 may capture video frames and communicate the video frames to the processor/SoC 110 (e.g., via the signal VIDEO). In the state 216, the processor/SoC 110 may perform analysis of the video frames (e.g., local video analytics), and the method 200 may move to the decision state 218. In the decision state 218, the processor/SoC 110 may determine whether sufficient ambient light is present (e.g., via image analysis results, or information from an ambient light sensor communicated using the signals SENS_a-SENS_N) for capturing color information related to an object of interest detected in the video frames.

If sufficient ambient light is available, the method 200 may move to the state 218. If sufficient ambient light is not available, the method 200 may move to the state 220. In the state 220, the processor/SoC 110 may turn on the one or more of the visible light LEDs 120 to allow color information to be captured, then move to the state 218. In the state 218, the processor/SoC 110 may record (e.g., via the memory 114) and/or stream (e.g., via the communications module 124) and/or present (e.g., via the signal VIDOUT) the images.

Figure 8:
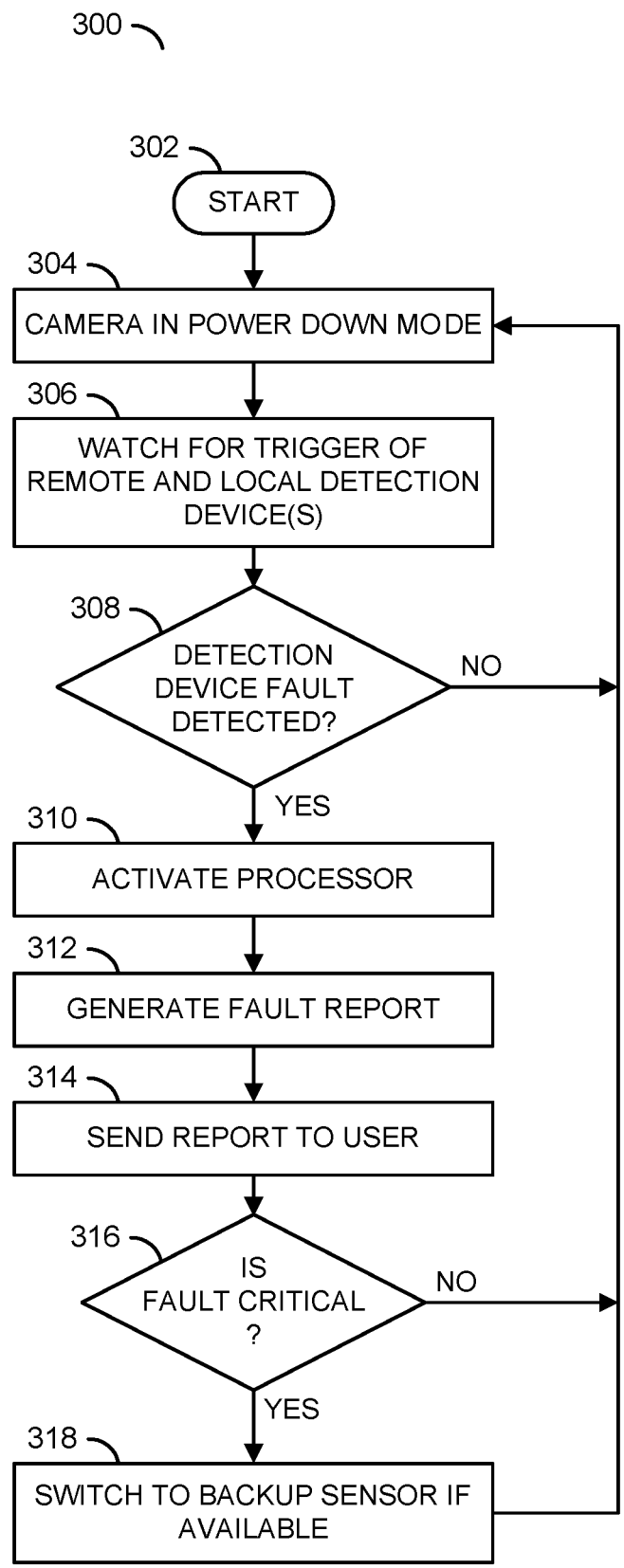
FIG. 8 is a diagram illustrating a process in accordance with an example embodiment of the invention.

Referring to FIG. 8, a flow diagram is shown illustrating a process 300 in accordance with another example embodiment of the invention. The process (or method) 300 may ensure a robust security system utilizing a battery-powered camera and remotely located sensors. The method 300 generally comprises a step (or state) 302, a step (or state) 304, a step (or state) 306, a decision step (or state) 308, a step (or state) 310, a step (or state) 312, a step (or state) 314, a decision step (or state) 316, and a step (or state) 318. The state 302 may start the method 300. The method 300 may then move to the state 304.

In the state 304, the camera 100 may be in a power down mode (e.g., a sleep mode, a low power mode, etc.). In the state 306, the camera 100 may watch for a trigger signal from any of the sensors 122. In an example, the trigger signals may be sent asynchronously. The camera is generally capable of reacting to a trigger signal even when in an inactive state. In some embodiments, the trigger signals may be utilized to communicate sensor health information in addition to detection of objects/motion. In the decision state 308, the camera 100 may react to receiving a trigger signal (e.g., the signals SENS_A-SENS_N) from one or more of the sensors 122 with fault information. If a trigger signal has been received from the sensors 122 indicating a device fault has been detected, the method 300 may move to the state 310. If a trigger signal has not been received from the sensors 122, the method 300 may move back to the state 304.

In the state 310, the camera 100 may activate the processor/SoC 110. In the state 312, the processor/SoC 110 may generate a fault report based on the received signals SENS_A-SENS_N. In the state 314, the processor/SoC 110 may send a report to the user. In the decision state 316, the processor/SoC 110 may perform analysis to determine whether the fault is critical to system operation. If the fault is critical, the method 300 may move to the state 318 to switch to a backup sensor, if available. If the fault is not critical, the method 300 may return to the state 304. In various embodiments, fault determinations may be based on fault information received from the sensors 122 and or analyses performed by the camera 100. In an example, the camera 100 may be configured to generate a fault report in response to being activated by an onboard sensor instead of being activated by a signal from one of the sensors 122.

In various embodiments, a battery powered camera and/or a doorbell camera are described that utilize one or more extra sensors, or Wi-Fi technology to identify motion ahead of time, and use low power communication with the battery powered camera or doorbell camera to activate the camera ahead of time, in order to mitigate the startup latency. A standalone low power sensor comprising a PIR sensor or a smart motion sensor is generally positioned further away (remotely) from the battery powered camera or doorbell camera. The remotely located sensing device communicates with the battery powered camera or doorbell camera via low power RF such as BLE, sub-1 GHz, Zigbee etc. The communication may be via direct connection, or through a Wi-Fi router, or a base station when the battery powered doorbell is connected with the base-station.

When a person walks towards the door, the sensing device is triggered first, then sends a signal to activate the battery powered camera or doorbell camera. The battery powered camera or doorbell camera then wakes up and starts an operation such as encoding video. The remotely located sensor is generally positioned to give enough time for the battery powered camera to be ready and provide more context to an event, and many times, recording the event of true interest. In an example, the one or more remotely located sensors may be placed at a distance from the camera, such that a travel time between the sensors and the field of view of the camera approximately encompasses the startup latency of the camera.

In some embodiments, the camera may build a history of which external sensor triggers the recording. Over time, the camera may collect a series of data and, for example, determine the amount of time needed from triggering to running analytics. Based on the trigger history, the camera may determine, for example, how long it takes someone to walk up to the camera when particular sensors are triggered. This could lead to benefits such as knowing around what time an interesting event occurs, allowing more meaningful snapshots to be sent to the end-user. The history may also be useful in helping the customer in cases where it might be preferred to re-position/adjust the sensor.

The functions and structures illustrated in the diagrams of FIGS. 1 to 8 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   a camera having a low power deactivated mode; and
   one or more sensors remotely located with respect to the camera, wherein (i) said one or more sensors are configured to communicate a signal to said camera in response to a trigger condition, (ii) said camera is configured to activate in response to receiving said signal from said one or more sensors, and (iii) said camera is further configured to generate a fault report in response to being activated by an onboard sensor instead of said one or more sensors.

2. The apparatus according to claim 1, wherein said camera comprises a doorbell camera.

3. The apparatus according to claim 1, wherein said camera is battery powered.

4. The apparatus according to claim 1, wherein said one or more sensors comprise at least one of a motion sensor and a proximity sensor.

5. The apparatus according to claim 1, wherein said one or more sensors comprise at least one of a passive infrared sensor and a smart motion sensor.

6. The apparatus according to claim 1, wherein said one or more sensors are battery powered.

7. The apparatus according to claim 1, wherein said one or more sensors are located outside a field of view of said camera.

8. The apparatus according to claim 1, wherein activation of said camera in response to said signal from said one or more sensors mitigates a startup latency of said camera.

9. The apparatus according to claim 1, wherein said camera is configured to generate a history correlating receiving said signal from said one or more sensors and detecting an object in a field of view of said camera.

10. A method of mitigating a startup latency of a camera comprising the steps of:
    detecting at least one of motion and proximity of an object outside a field of view of said camera using one or more sensors remotely located from said camera;
    sending a trigger signal from said one or more sensors to activate said camera prior to said object entering said field of view of said camera; and
    generating a fault report in response to said camera being activated by an onboard sensor instead of said trigger signal from said one or more sensors.

11. The method according to claim 10, wherein said camera and said sensors are battery powered.

12. The method according to claim 10, wherein said camera comprises a doorbell camera.

13. The method according to claim 10, wherein said one or more sensors comprise at least one of a motion sensor and a proximity sensor.

14. The method according to claim 10, wherein said one or more sensors comprise at least one of a passive infrared sensor and a smart motion sensor.

15. The method according to claim 14, wherein said smart motion sensor is configured to detect a person.

16. The method according to claim 15, wherein said smart motion sensor utilizes deep learning technology to detect said person.

17. The method according to claim 10, further comprising:
    placing said one or more sensors at a distance from said camera, wherein a travel time between said one or more sensors and said field of view of said camera approximately encompasses said startup latency of said camera.

18. The method according to claim 10, further comprising:
    generating a history correlating receiving said trigger signal from said one or more sensors and detecting said object in said field of view of said camera.

* * * * *